(12) United States Patent
Yamada et al.

(10) Patent No.: US 9,170,401 B2
(45) Date of Patent: Oct. 27, 2015

(54) WIDE ANGLE LENS AND IMAGING APPARATUS

(71) Applicant: FUJIFILM Corporation, Tokyo (JP)

(72) Inventors: Hiroshi Yamada, Saitama-ken (JP); Michio Cho, Saitama-ken (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/451,467

(22) Filed: Aug. 5, 2014

(65) Prior Publication Data
US 2014/0340563 A1 Nov. 20, 2014

Related U.S. Application Data

(63) Continuation of application No. PCT/JP2013/000515, filed on Jan. 31, 2013.

(30) Foreign Application Priority Data

Feb. 6, 2012 (JP) ................. 2012/022720

(51) Int. Cl.
G02B 3/02 (2006.01)
G02B 9/64 (2006.01)
G02B 9/14 (2006.01)
G02B 13/06 (2006.01)
H04N 5/225 (2006.01)

(52) U.S. Cl.
CPC .. *G02B 9/64* (2013.01); *G02B 9/14* (2013.01); *G02B 13/06* (2013.01); *H04N 5/2254* (2013.01)

(58) Field of Classification Search
CPC .................................................. G02B 13/0035
USPC ........................................................ 359/716
See application file for complete search history.

(56) References Cited

U.S. PATENT DOCUMENTS

| 5,742,439 | A | 4/1998 | Schuster |
| 5,949,589 | A | 9/1999 | Nakazawa |
| 6,317,269 | B1 | 11/2001 | Yamamoto |
| 2005/0286138 | A1* | 12/2005 | Matsusaka .................... 359/680 |
| 2006/0280498 | A1 | 12/2006 | Souma et al. |

FOREIGN PATENT DOCUMENTS

| JP | 08-94926 | 4/1996 |
| JP | 10-260346 | 9/1998 |

(Continued)

OTHER PUBLICATIONS

International Search Report PCT/JP2013/000515 dated Apr. 23, 2013.

*Primary Examiner* — James Jones
(74) *Attorney, Agent, or Firm* — Young & Thompson

(57) ABSTRACT

A wide angle lens includes: a positive first lens group, a second lens group, constituted by two or fewer lenses, that moves during focusing operations, and a third lens group that includes at least one positive lens, provided in this order from the object side. The first lens group includes at least a positive meniscus lens with a convex surface toward the object side, a negative meniscus lens with a convex surface toward the object side, a lens having a concave surface with a radius of curvature having a smaller absolute value toward the image side, a negative lens, a cemented lens formed by a positive lens and a negative lens, and an aperture stop provided adjacent to the cemented lens toward the image side thereof, provided in this order from the object side. The wide angle lens satisfies a predetermined conditional formula.

17 Claims, 9 Drawing Sheets

(56) References Cited

FOREIGN PATENT DOCUMENTS

| | | |
|---|---|---|
| JP | 2001-166205 | 6/2001 |
| JP | 2003-195164 | 7/2003 |
| JP | 2005-164839 | 6/2005 |
| JP | 2006-003655 | 1/2006 |
| JP | 2006-343554 | 12/2006 |
| JP | 2011-186269 | 9/2011 |

* cited by examiner

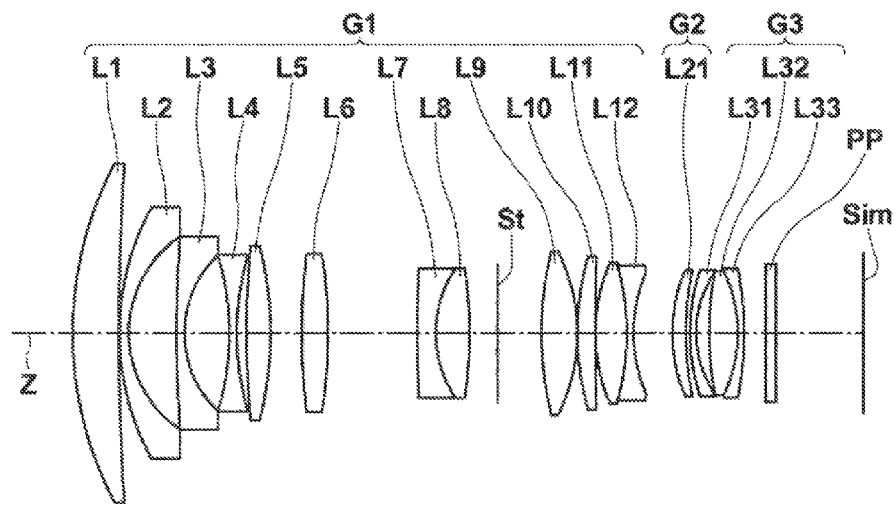
FIG.1  EXAMPLE 1
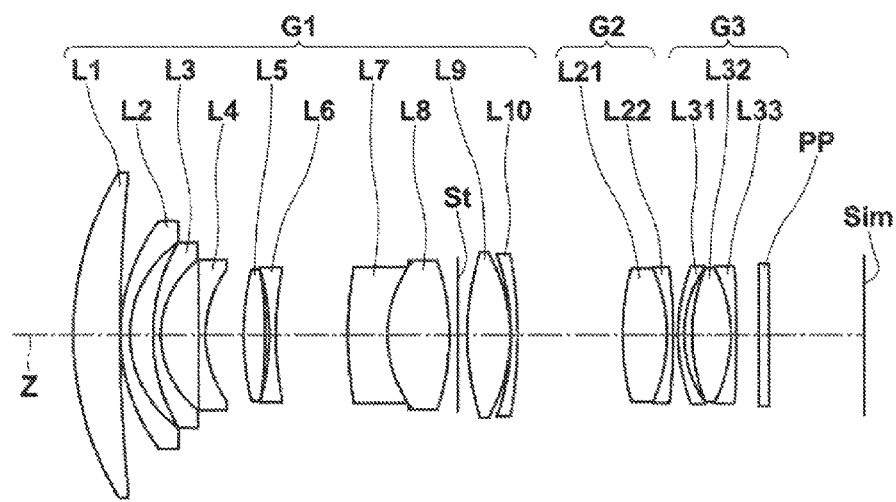
FIG.2  EXAMPLE 2

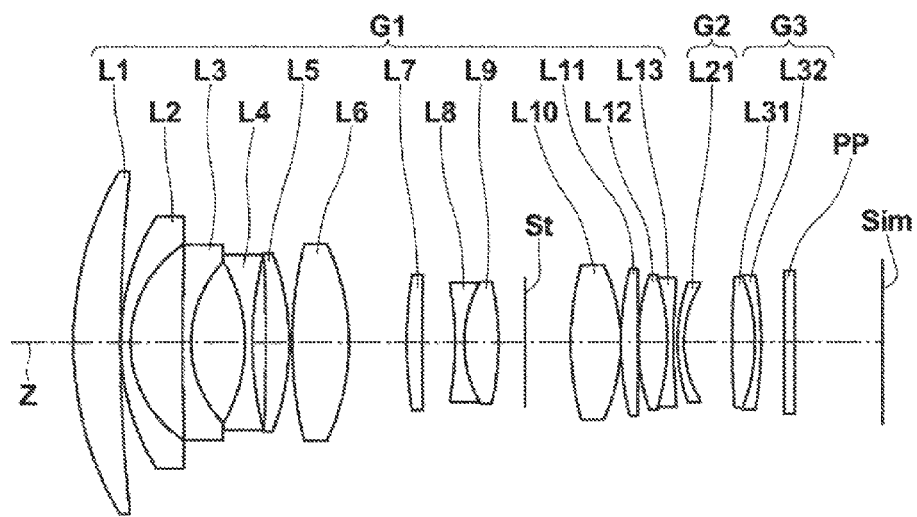
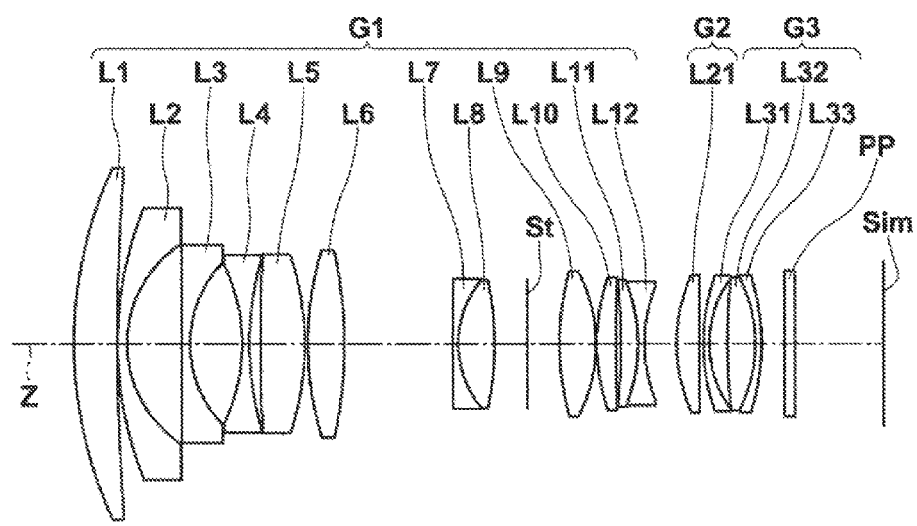

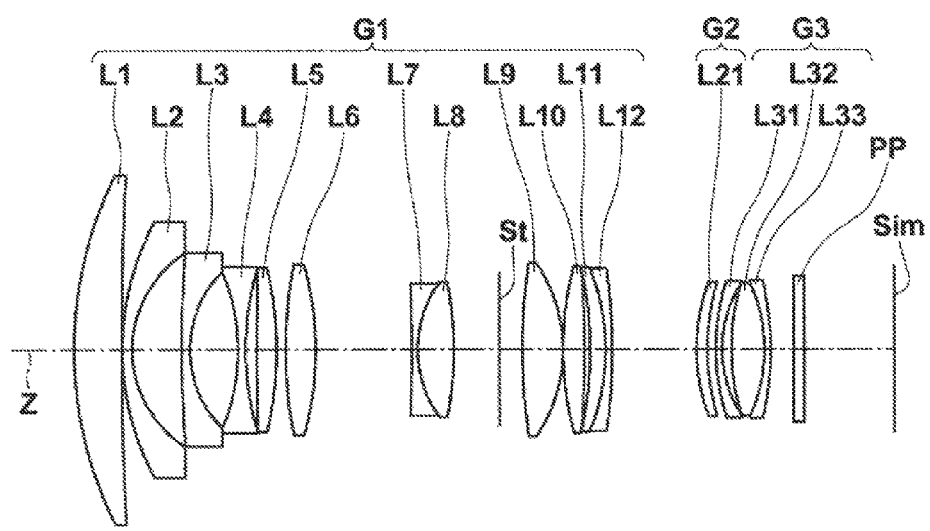
FIG.5 EXAMPLE 5

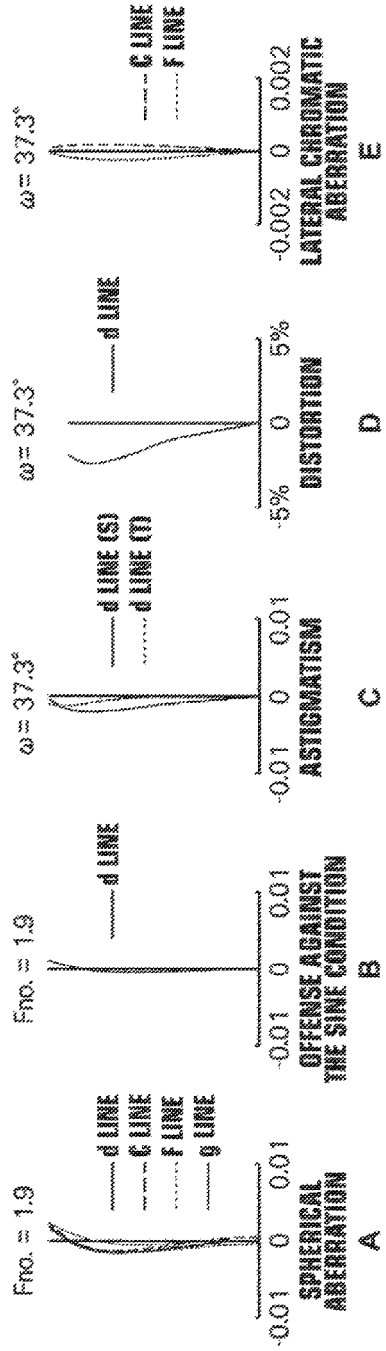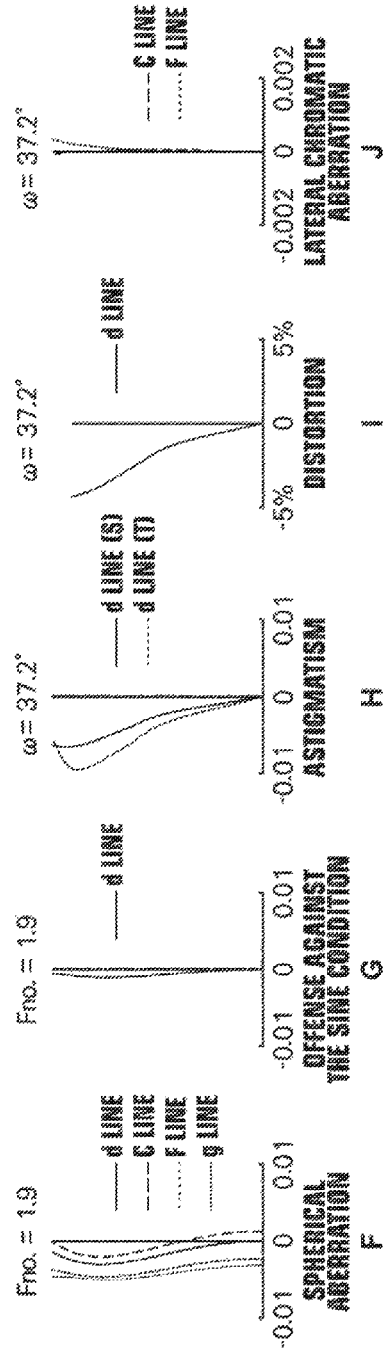

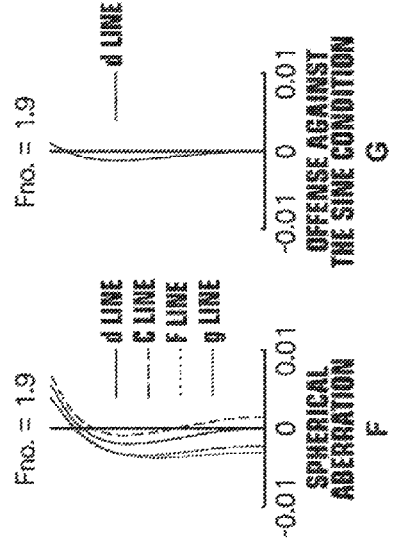

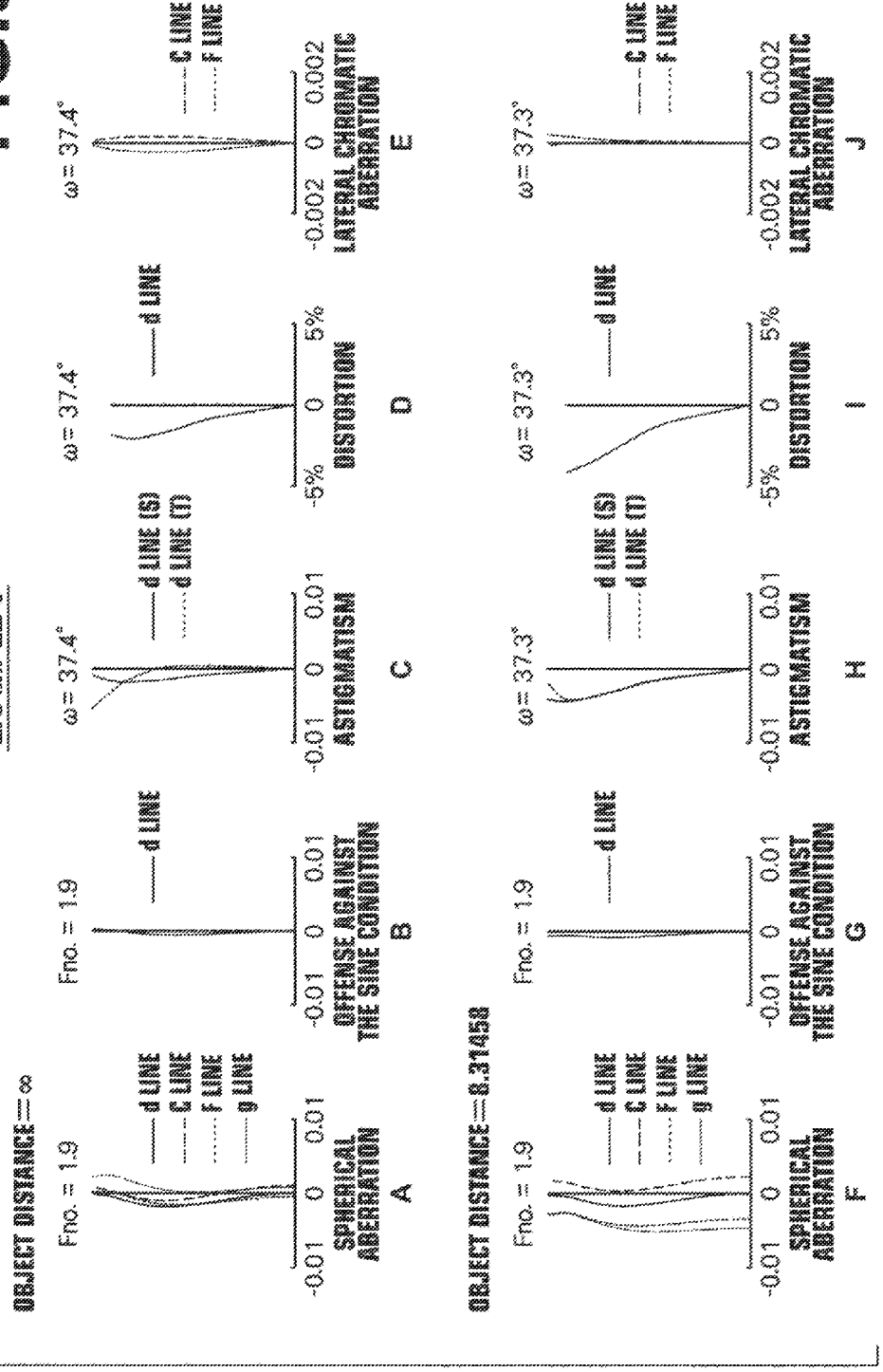

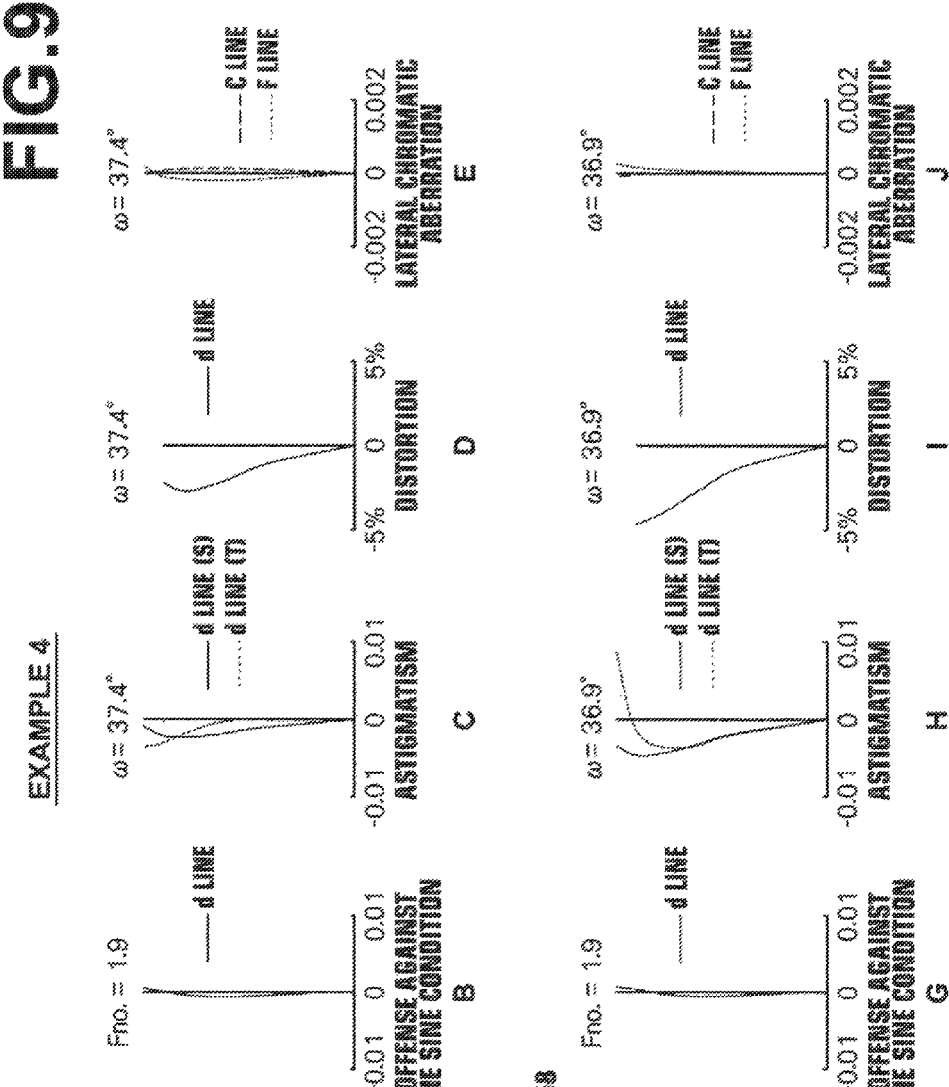

WIDE ANGLE LENS AND IMAGING APPARATUS

CROSS REFERENCE TO RELATED APPLICATIONS

The present application is a Continuation of PCT International Application No. PCT/JP2013/000515 filed on Jan. 31, 2013, which claims priority under 35 USC §119 (a) to Japanese Patent Application No. 2012-022720 filed on Feb. 6, 2012. Each of the above applications is hereby expressly incorporated by reference in its entirety, into the present application.

TECHNICAL FIELD

The present invention is related to a wide angle lens for use in digital cameras, broadcast cameras, cinematic cameras, etc. The present invention is also related to an imaging apparatus equipped with the wide angle lens.

BACKGROUND ART

Conventionally, various lenses that realize wide angles of view have been proposed, and are being favorably employed as optical systems in digital cameras, broadcast cameras, cinematic cameras, and the like, for example. The lenses disclosed in Japanese Unexamined Patent Publication Nos. 10 (1998)-260346, 8(1996)-094926, and 2011-186269 having angles of view greater than 60 degrees are examples of such lenses.

DISCLOSURE OF THE INVENTION

Here, there is demand for a lens having a wide angle of view with an F number small enough to enable imaging under low light conditions, particularly for application as a cinematic lens. However, the lenses disclosed in Japanese Unexamined Patent Publication Nos. 10(1998)-260346 and 2011-186269 are required to have even smaller F numbers, and the lens disclosed in Japanese Unexamined Patent Publication No. 8(1996)-094926 is required to have a wider angle of view.

Further, there is increasing demand for cinematic lenses that have fast focusing speeds, and therefore it is desired for the weight of lens groups that perform focusing operations to be reduced. Recently, there is demand for an optical system to be realized that satisfies all of the above needs. However, the optical system disclosed in Japanese Unexamined Patent Publication No. 8(1996)-094926 moves the entirety of the lens groups positioned more toward the image side than an aperture stop. Therefore, the weight of the lens groups that move is heavy, and it is difficult to realize an expedient focusing speed. In addition, the optical system disclosed in Japanese Unexamined Patent Publication No. 2011-186269 performs focusing operations by moving two lens groups in movement directions which are set for each lens group for amounts of movement which are also set for each lens group. Therefore, it is necessary for the weights of the lens groups that move to be further reduced in order to accelerate focusing speed.

The present invention has been developed in view of the forgoing circumstances. It is an object of the present invention to provide a wide angle lens which has a small F number, that achieves a widening of the angle of view and a reduction in weight of a lens group that moves to perform focusing operations, and which also has high optical performance. It is another object of the present invention to provide an imaging apparatus equipped with the wide angle lens.

A wide angle lens of the present invention substantially consists of three lens groups, which are:

a first lens group having a positive refractive power which is fixed in the direction of an optical axis during focusing operations;

a second lens group that moves along the optical axis during focusing operations; and a third lens group which is fixed in the direction of the optical axis during focusing operations, provided in this order from an object side;

the first lens group comprising:

a first lens having a positive refractive power and is of a meniscus shape having a convex surface toward the object side;

a second lens having a negative refractive power and is of a meniscus shape having a convex surface toward the object side;

a third lens having a negative refractive power and a concave surface with a radius of curvature having the smaller absolute value toward an image side; and a fourth lens having a negative refractive power, provided in this order from the object side;

the wide angle lens further comprising:

a cemented lens formed by cementing a lens having a positive refractive power and a lens having a negative refractive power together, provided more toward the image side than the fourth lens; and an aperture stop provided adjacent to the cemented lens toward the image side thereof;

the second lens group substantially consisting of two or fewer lenses;

the third lens group comprising at least one positive lens; and the wide angle lens satisfying Conditional Formula (1) below. Note that it is more preferable for the wide angle lens of the present invention to satisfy Conditional Formula (1-1) below, and even more preferable for the wide angle lens of the present invention to satisfy Conditional Formula (1-2).

$$0.00 < f/f1 < 2.00 \tag{1}$$

$$0.40 < f/f1 < 1.60 \tag{1-1}$$

$$0.50 < f/f1 < 1.50 \tag{1-2}$$

wherein f1 is the focal length of the first lens group, and f is the focal length of the entire system in a state focused on infinity.

In addition, it is preferable for the wide angle lens of the present invention to further satisfy Conditional Formula (2) below, and more preferable for the wide angle lens of the present invention to further satisfy Conditional Formula (2-1) below.

$$0.00 < |f/f2| < 0.50 \tag{2}$$

$$0.05 < |f/f2| < 0.40 \tag{2-1}$$

wherein f is the focal length of the entire system in a state focused on infinity, and f2 is the focal length of the second lens group.

In addition, it is preferable for the first lens group of the wide angle lens of the present invention to further comprise a fifth lens having a positive refractive power, provided adjacent to the fourth lens toward the image side thereof.

In addition, it is preferable for the second lens group of the wide angle lens of the present invention to substantially consist of a single lens having a positive refractive power. Alternatively, the second lens group may substantially consist of a single cemented lens, formed by cementing a lens having a positive refractive power and a lens having a negative refractive power together.

In the case that the second lens group substantially consists of a single lens having a positive refractive power or a single cemented lens, formed by cementing a lens having a positive refractive power and a lens having a negative refractive power together as described above, it is preferable for Conditional Formula (3) below to be satisfied, more preferable for Conditional Formula (3-1) to be satisfied, and even more preferable for Conditional Formula (3-2) to be satisfied.

$$35 < v2p \quad (3)$$

$$45 < v2p \quad (3\text{-}1)$$

$$70 < v2p \quad (3\text{-}2)$$

wherein $v2p$ is the Abbe's number of the positive lens within the second lens group with respect to the d line.

As another alternative, in the wide angle lens of the present invention, the second lens may substantially consist of a single lens having a negative refractive power. In this case, it is preferable for Conditional Formula (4) below to be satisfied.

$$35 < v2n \quad (4)$$

wherein $v2n$ is the Abbe's number of the negative lens within the second lens group with respect to the d line.

Note that the term "substantially" in the expressions "substantially consists of three lens groups", "substantially consists of two or fewer lenses", "substantially consist of a single lens", and "substantially consist of a single cemented lens" means that the wide angle lens may also include lenses that practically do not have any power, optical elements other than lenses, such as an aperture stop and a cover glass, and mechanical components, such as lens flanges, a lens barrel, an imaging element, and a camera shake correcting mechanism, in addition to the lens groups and lenses which have been listed as constituent elements.

Note that the expression "lens group" is not necessarily limited to those constituted by a plurality of lenses, and may include those that consist of a single lens.

Note that the surface shapes of lenses as well as the signs of the refractive powers of lenses in the wide angle lens of the present invention are considered in the paraxial region for lenses that include aspnerical surfaces. In addition, the signs of the radii of curvature are positive in the case that the shape of a surface is convex toward the object side, and negative in the case that the shape of a surface is convex toward the image side.

Note that in the wide angle lens of the present invention, the expression "comprising . . . a fourth lens having a negative refractive power . . . further comprising: a cemented lens formed by cementing a lens having a positive refractive power and a lens having a negative refractive power together, provided more toward the image side than the fourth lens" refers both, to cases in which the cemented lens is provided immediately adjacent to the fourth lens toward the image side thereof and also cases in which one or more other lenses are provided between the fourth lens and the cemented lens.

Note that in the wide angle lens of the present invention, the expression "a cemented lens formed by cementing a lens having a positive refractive power and a lens having a negative refractive power together" may refer both to a cemented lens in which a lens having a positive refractive power and a lens having a negative refractive power are cemented together in this order from the object side, and a cemented lens in which a lens having a negative refractive power and a lens having a positive refractive power are cemented together in this order from, the object side.

An imaging apparatus of the present invention is characterized by being equipped with the wide angle lens of the present invention and an imaging element that captures images of subjects formed by the wide angle lens.

The wide angle lens of the present invention is a lens system constituted by the positive first lens group which is fixed during focusing operations, the second lens group that moves along the optical axis during focusing operations, and the third lens group which is fixed during focusing operations, in which the lens configurations of the first lens group and the second lens group are particularly favorably set. Therefore, a small F number, a widening of the angle of view, and a reduction in weight of a lens group that moves to perform focusing operations can be achieved, while also realizing high optical performance.

The imaging apparatus of the present, invention is equipped with the wide angle lens of the present invention. Therefore, focusing speed is fast, and bright, high quality images can be obtained.

BRIEF DESCRIPTION OF THE DRAWINGS

FIG. 1 is a sectional diagram that illustrates the lens configuration of a wide angle lens according to Example 1 of the present invention.

FIG. 2 is a sectional diagram that illustrates the lens configuration of a wide angle lens according to Example 2 of the present invention.

FIG. 3 is a sectional diagram that illustrates the lens configuration of a wide angle lens according to Example 3 of the present invention.

FIG. 4 is a sectional diagram that illustrates the lens configuration of a wide angle lens according to Example 4 of the present invention.

FIG. 5 is a sectional diagram that illustrates the lens configuration of a wide angle lens according to Example 5 of the present invention.

A through J of FIG. 6 are diagrams that illustrate various aberrations of the wide angle lens according to Example 1 of the present invention.

A through J of FIG. 7 are diagrams that illustrate various aberrations of the wide angle lens according to Example 2 of the present invention.

A through J of FIG. 8 are diagrams that illustrate various aberrations of the wide angle lens according to Example 3 of the present invention.

A through J of FIG. 9 are diagrams that illustrate various aberrations of the wide angle lens according to Example 4 of the present invention.

Figure 10:
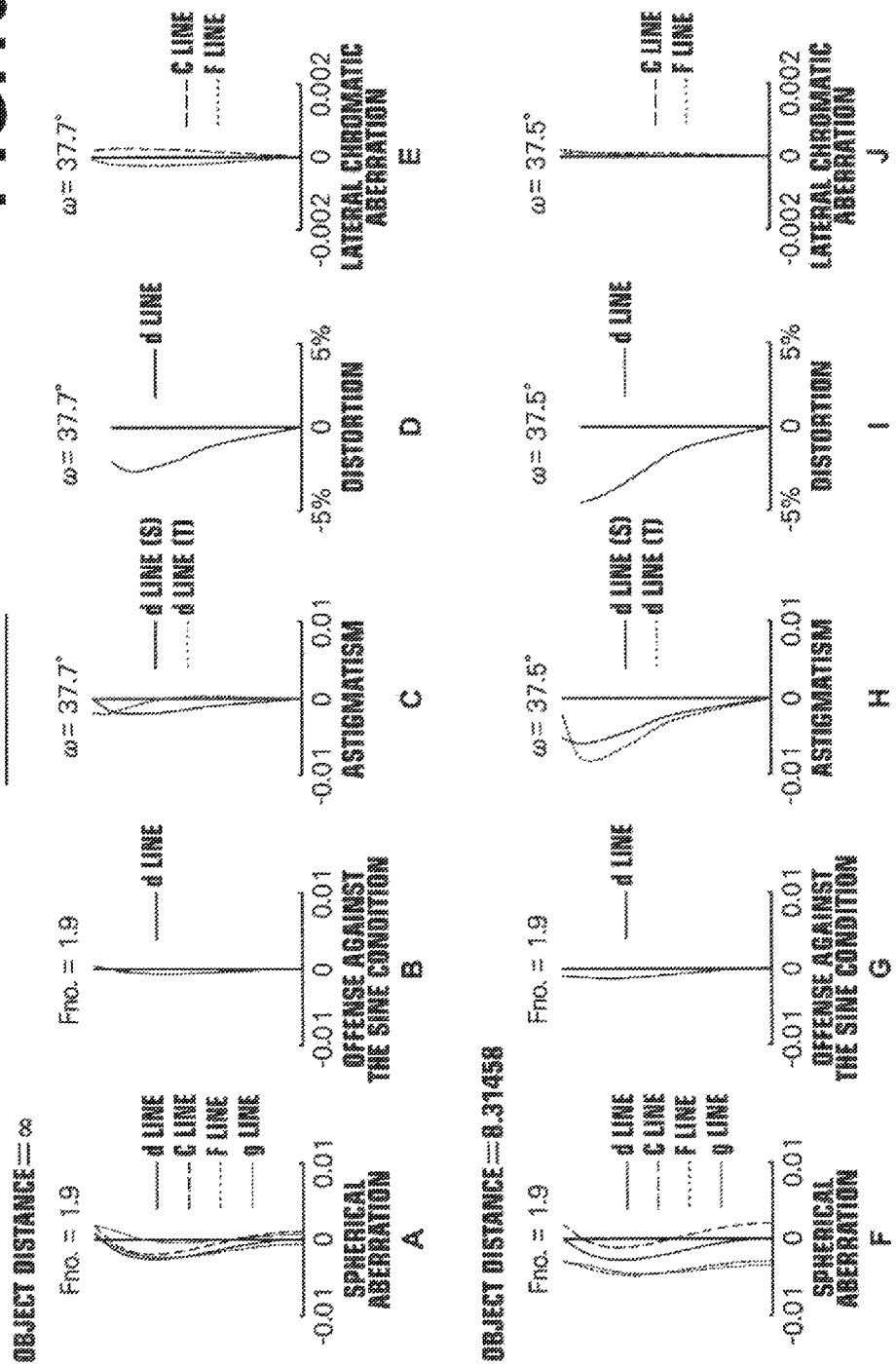

A through J of FIG. 10 are diagrams that illustrate various aberrations of the wide angle lens according to Example 5 of the present invention.

Figure 11:
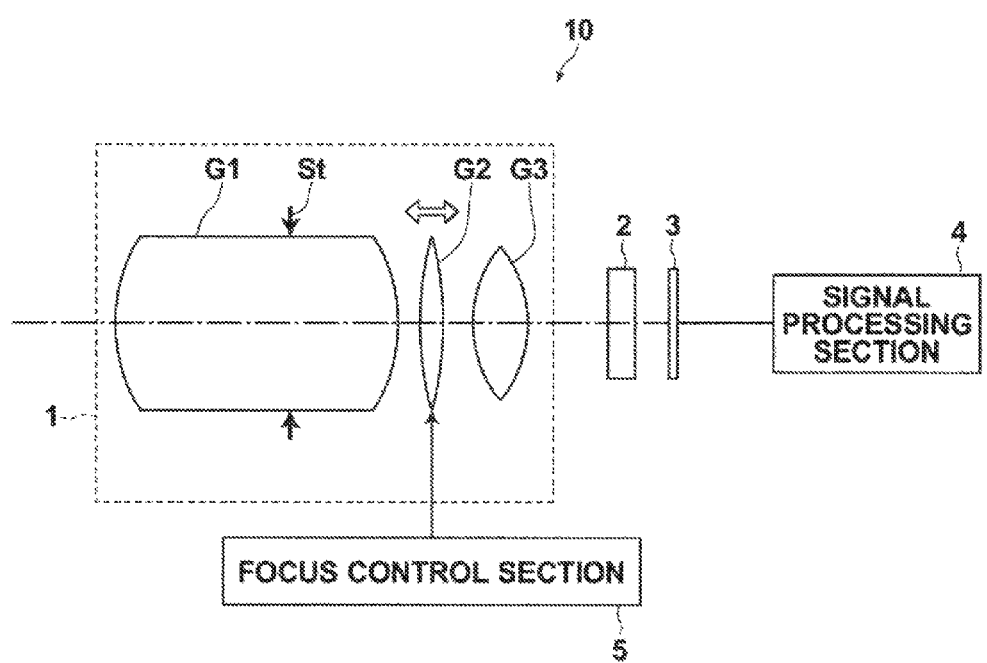

FIG. 11 is a diagram that illustrates the schematic configuration of an imaging apparatus according to an embodiment of the present invention.

BEST MODE FOR CARRYING OUT THE INVENTION

Hereinafter, a first embodiment of the present invention will be described in detail with reference to the attached drawings. FIG. 1 is a sectional diagram that illustrates the configuration of a wide angle lens according to the first embodiment of the present invention, and corresponds to a wide angle lens of Example 1 to be described later. FIG. 2 through FIG. 5 are cross sectional diagrams that illustrate the configurations of wide angle lenses according to a second embodiment through a fifth embodiment of the present invention, and correspond to wide angle lenses of Examples 2 through 5 to be described later. The basic configurations of the embodiments illustrated in FIG. 1 through FIG. 5 are the same. The manners in which the configurations are illustrated are also the same. Therefore, the wide angle lenses according to the embodiments of the present invention will be described mainly with reference to FIG. 1. With respect to the examples illustrated in FIGS. 2 through 5, descriptions which are common with those of the example illustrated in FIG. 1 will be omitted as appropriate, and descriptions regarding common manners of illustration will also be omitted.

The wide angle lens of the first embodiment substantially consists of: a first lens group G1 having a positive refractive power, a second lens group G2 that moves during focusing operations, and a third lens group G3, provided in this order from the object side. The first lens group G1 and the third lens group G3 are fixed in the direction of the optical, axis during focusing operations, and focusing is performed by moving the second lens group G2 along the optical axis Z.

The lens configuration illustrated in FIG. 1 shows the arrangement of lenses when focused on an object at an infinite distance (a state focused on infinity). In FIG. 1, the left side is the object side, and the right side is the image side.

In the example illustrated in FIG. 1, an aperture stop St is provided within the first lens group G1. Note that the aperture stop St illustrated in FIG. 1 does not necessarily represent the size or shape thereof, but only the position thereof along the optical axis Z.

In the case that the wide angle lens is mounted on an imaging apparatus, it is preferable for a cover glass for protecting the imaging surface of the imaging element, a prism such as a color separating prism, and various filters, such as a low pass filter and an infrared cutoff filter to be provided between the wide angle lens and an imaging surface, according to the specification of the imaging apparatus. FIG. 1 illustrates an example in which an optical member PP is provided assuming the presence of the cover glass, the various types of filters, and the like between the lens group most toward the image side and the imaging surface Sim.

As illustrated in FIG. 1, the first lens group G1 is equipped with a first lens L1 having a positive refractive power and a meniscus shape with a convex surface toward the object side, most toward the object side. By adopting this configuration, distortion and/or lateral chromatic aberration can be favorably corrected.

Next, the first lens group G1 is equipped with a second lens L2 having a negative refractive power and a meniscus shape with a convex surface toward the object side, second in order from the object side. By adopting this configuration, the incident angles of rays of light that pass through the second lens group G2 and enter the third lens group G3 can be maintained small. Accordingly, the generation of astigmatism can be favorably reduced.

Further, the first lens group G1 is equipped with a third lens L3 having a negative refractive power and a concave surface with a radius of curvature having a smaller absolute value toward the image side, third in order from the object side. By adopting this configuration, the incident angles of rays of light that pass through the second lens group G2 and enter the third lens group G3 can be maintained small. Accordingly, the generation of astigmatism can be favorably reduced. Note that in the case that, the third lens L3 is a meniscus lens having a negative refractive power and a convex surface toward the object side, the same advantageous effects can be more favorably obtained.

Next, the first lens group G1 is equipped with a fourth lens L4 having a negative refractive power, fourth in order from the object. side. By adopting this configuration, the incident angles of rays of light that pass through the second lens group G2 and enter the third lens group G3 can be maintained small. Accordingly, the generation of astigmatism can be favorably reduced. Note that in the case that the fourth lens L4 is a biconcave lens, the same advantageous effects can be more favorably obtained.

Further, it is preferable for a fifth lens having a positive refractive power to be provided adjacent to the fourth lens toward the image side, as illustrated in FIG. 1. In this case, astigmatism which is generated as light beams pass through each of the second lens L2, the third lens L3, and the fourth, lens L4 can be favorably corrected. In addition, in the case that the fifth lens L5 is a biconvex lens, the same advantageous effects can be more favorably obtained.

Further, it is preferable for the first lens group G1 to be equipped with a biconvex sixth lens L6 toward the image side of the fifth lens L5. Thereby, astigmatism which is generated as light beams pass through each of the second lens L2, the third lens L3, and the fourth lens L4 can be more favorably corrected.

In addition, the first lens group G1 is equipped with a cemented lens formed by cementing a lens having a positive refractive power and a lens having a negative refractive power together at least more toward the image side than the fourth lens L4, and the aperture stop St provided adjacent to the cemented lens toward the image side thereof. By providing the cemented lens formed by cementing the lens having a positive refractive power and the lens having a negative refractive power together at a position at least more toward the image side than the fourth lens L4 and adjacent to the aperture stop St toward the object side thereof, longitudinal chromatic aberration and/or lateral chromatic aberration can be corrected. In the case that the cemented lens consists of a seventh lens L7 having a meniscus shape with a concave surface toward the image side and a biconvex eighth lens L8 as illustrated in FIG. 1, these advantageous effects can be favorably obtained. Note that in each of the embodiments, the cemented lens formed by cementing the lens having a positive refractive power and the lens having a negative refractive power together provided adjacent to the aperture stop toward, the object side thereof may be either a cemented lens in which a lens having a positive refractive power and a lens having a negative refractive power are cemented together in this order from, the object side, and a cemented lens in which a lens having a negative refractive power and a lens having a positive refractive power are cemented together in this order from the object, side.

Note that various changes are possible to the lens configurations to be provided between the fourth lens L4 and the cemented lens provided, adjacent to the aperture stop St toward the object side thereof within a range that maintains the performance of the present, wide angle lens. For example, one or more lenses may be provided as in the second through fifth embodiments to be described later.

In the first lens group G1 of the first embodiment, the lens configurations provided more toward, the image side than the aperture stop St are a biconvex ninth lens L9, a tenth lens L10 having a positive refractive power and a meniscus shape with, a convex surface toward the object side, and a cemented lens formed by cementing a biconvex eleventh lens L11 and a biconcave twelfth lens L12 together. In the first lens group G1 of the first embodiment, three lenses, which are the ninth lens L9, the tenth lens L10, and the eleventh lens L11 having positive refractive powers mainly bear the positive refractive power of the entire system. By providing these three lenses toward the image side of the aperture stop St, the incident angle of rays of light which have passed through the peripheral portions of the first lens group G1 (portions having high image heights) and enter the second lens group G2 can be maintained small. Therefore, variations in the angle of view during focusing operations can be suppressed. In addition, by configuring the twelfth lens L12 to be of a biconcave shape, spherical aberration and lateral chromatic aberration can be favorably corrected.

In addition, various changes are possible to the lens configurations to be provided between the aperture stop S1 within the first lens group G1 and the lens most toward the object side in the second lens group G2 within a range that maintains the performance of the present wide angle lens. For example, one or more lenses may be provided as in the second through fifth embodiments to be described later.

In addition, the first lens group G1 satisfies Conditional Formula (1) below.

$$0.00 < f/f1 < 2.00 \tag{1}$$

$$0.40 < f/f1 < 1.60 \tag{1-1}$$

$$0.50 < f/f1 < 1.50 \tag{1-2}$$

wherein f1 is the focal length of the first lens group, and f is the focal length of the entire system in a state focused on infinity.

If the value of f/f1 is less than the lower limit defined in Conditional Formula (1), it will become necessary to increase the diameter of the second lens group G2, which will lead to an increase in the weight of the second, lens group G2. Accordingly, it will become difficult to design the second lens G2 to be lightweight. In addition, if the value of f/f1 is greater than the upper limit defined in Conditional Formula (1), this will lead to an increase in variations of the angle of view during focusing operations. By satisfying Conditional Formula (1), variations in the angle of view during focusing operations can be maintained at favorable levels, and the weight of the second lens group G2 can be favorably reduced. In order to cause the advantageous effects obtained by satisfying Conditional Formula (1) to become more prominent, it is more preferable for Conditional Formula (1-1) to be satisfied, and even more preferable for Conditional Formula (1-2) to be satisfied.

In addition, the first lens group G1 is constituted by a 1A lens group, the aperture stop St, and a 1B lens group, in this order from the object side. The 1A lens group is a partial lens group within the first lens group G1 that includes all of the lenses provided more toward the object side than the aperture stop St, and the 1B lens group is a partial lens group within the first lens group G1 that includes all of the lenses provided more toward the image side than the aperture stop St. It is preferable for the focal lengths f1a and f1b of the 1A lens group and the 1B lens group to simultaneously satisfy Conditional Formulae (5) and (6) below.

$$f1a < 0 \tag{5}$$

$$0 < f1b \tag{6}$$

wherein f1a is the focal length of the 1A lens group constituted by all of the lenses within the first lens group provided more toward the object side than the aperture stop, and f1b is the focal length of the 1B lens group constituted by all of the lenses within the first lens group provided more toward the image side than the aperture stop.

In the case that Conditional Formulae (5) and (6) are satisfied, the 1A lens group will have a negative refractive power and the 1B lens group will have a positive refractive power within the first lens group G1. Therefore, the incident angle of rays of light which, have passed through the peripheral portions of the first lens group G1 (portions having high image heights) and enter the second lens group G2 can be maintained small. Therefore, variations in the angle of view during focusing operations can be suppressed. Note that all of the first through fifth embodiments described in the present specification satisfy Conditional Formulae (5) and (6).

The second lens group G2 substantially consists of two or fewer lenses. It is preferable for the second lens group G2 to substantially consist of a single lens having a positive refractive power, provided in this order from, the object side, as shown in the first embodiment. In the case that the second lens group G2 consists of a single lens in this manner, reduction in the weight, of the second lens group G2 can be favorably realized. In addition, in the case that the second lens group G2 substantially consists of a single lens having a positive refractive power, it is preferable for a $21^{st}$ lens L21 that, constitutes the second lens group G2 to be a meniscus lens with a convex surface toward the object side. Thereby, variations in spherical aberration during focusing operations can be favorably suppressed.

It is further preferable for the second lens group G2 to further satisfy Conditional Formula (2) below, $$0.00 < f/|f2| < 0.50 \tag{2}$$

$$0.05 < f/|f2| 0.40 \tag{2-1}$$

wherein f is the focal length of the entire system in a state focused on infinity, and f2 is the focal length of the second lens group.

If the value of f/|f2| is less than the lower limit defined in Conditional Formula (2), the amount of movement during focusing operations will become large, and therefore variations in the angle of view during focusing operations will become great. In addition, if the value of f/|f2| is greater than the upper limit defined in Conditional Formula (2), the refractive power of the second lens group G2 that performs focusing operations will become excessively great. This will lead to variations in the angle of view during focusing operations. For these reasons, variations in the angle of view during focusing operations can be favorably suppressed. In order to cause the advantageous effects obtained by satisfying Conditional Formula (2) to become more prominent, it is more preferable for Conditional Formula (2-1) to be satisfied.

In addition, if the second lens group G2 is a single lens having a positive refractive power as described above, it is preferable for Conditional Formula (3) below to be satisfied.

$$35 < v2p \tag{3}$$

$$45 < v2p \tag{3-1}$$

$$70 < v2p \tag{3-2}$$

wherein v2p is the Abbe's number of the positive lens within the second lens group with respect to the d line.

In the case that Conditional Formula (3) is satisfied, variations in chromatic aberrations during focusing operations can be favorably suppressed. In order to cause the advantageous effects obtained by satisfying Conditional Formula (3) to become more prominent, it is more preferable for Conditional Formula (3-1) to be satisfied, and even more preferable for Conditional Formula (3-2) to be satisfied. In the first embodiment, the value of ν2p is greater than 80, which is sufficiently large. Therefore, variations in chromatic aberrations during focusing operations can be even more favorably suppressed.

The third lens group G3 is equipped with at least one lens having a positive refractive power. By adopting this configuration, longitudinal chromatic aberration and lateral chromatic aberration can be favorably balanced. Note that the lens configuration of the third lens group G3 may be changed within a range that maintains the performance of the present wide angle lens. For example, one or more lenses may be provided in addition to the at least one positive lens, as in the second through fifth embodiments to be described later.

The third lens group G3 of the first embodiment consists of a $31^{st}$ lens L31 having a negative refractive power and a meniscus shape with a concave surface toward the image side, and a cemented lens formed by cementing a biconvex $32^{nd}$ lens L32 and a $33^{rd}$ lens L33 having a negative refractive power and a meniscus shape with a concave surface toward the object side together, provided, in this order from the object side. By configuring the third lens group G3 in this manner, longitudinal chromatic aberration and lateral chromatic aberration can be favorably balanced.

It is preferable for the lens configurations of each of the first lens group G1, the second lens group G2, and the third lens group G3 to be set such that this wide angle lens can achieve an angle of view of 70 degrees or greater. The above lens configurations are set in each of the first through fifth embodiments such that a sufficiently great angle of view exceeding 70 degrees can be achieved.

Next, a wide angle lens according to the second embodiment of the present invention will be described with reference to FIG. 2. FIG. 2 is a sectional diagram that illustrates the lens configuration of the wide angle lens according to the second embodiment of the present invention, which corresponds to the wide angle lens of Example 2 to be described later.

Note that each of the wide angle lenses of the second through fifth embodiments of the present invention substantially consist of three lens groups, which are a first lens group G1 having a positive refractive power, a second lens group G2 that moves during focusing operations, and a third, lens group G3. The first, lens group G1 and the third lens group G3 are fixed in the direction of the optical axis during focusing operations, and focusing is performed by moving the second lens group G2 along the optical axis Z. For this reason, only the detailed configurations of the lenses that, constitute each of the lens groups will be described in connection with the second through fifth embodiments below. Hereinafter, the operational effects of configurations which are common in the first, through fifth embodiments are the same as those described in the description of the first embodiment. Therefore, a description will mainly be given of portions that differ from the first embodiment, and redundant descriptions will be omitted.

As illustrated in FIG. 2, the first lens group G1 of the second embodiment has the same basic lens configurations for first through fifth lenses L1, L2, L3, L4, and L5, as well as for seventh and eighth lenses L7 and L8. The operational effects of these lens configurations are the same as those described, in connection with the first embodiment. Hereinafter, portions of the first lens group G1 of the second embodiment which are different from those of the first embodiment will be described.

As illustrated in FIG. 2, a sixth lens L6 of the first lens group G1, which is the sixth lens in order from, the object, side, may be configured as a biconcave lens. In the case that, the fifth lens L5 is a biconvex lens, astigmatism can be favorably corrected, by configuring the sixth lens L6 to be of a biconcave shape. In this case, it is preferable for the refractive index of the sixth lens L6 to be lower than that of the fifth lens L5, and for the Abbe's number of the sixth lens L6 to be greater than that of the fifth lens L5. By adopting such a configuration, lateral chromatic aberration and astigmatism can be more favorably corrected.

In addition, it is preferable for the lens configurations within the first lens group G1 provided toward the image side from an aperture stop St to be a biconvex ninth lens L9 and a tenth lens L10 having a negative refractive power and a meniscus shape with a concave surface toward the object side, as in the second embodiment. In the second embodiment, the biconvex ninth lens L9 bears the main portion of the positive refractive power of the entire system. By providing the ninth, lens L9 toward the image side of the aperture stop St, the incident angle of rays of light which have passed through the peripheral portions of the first lens group G1 (portions having high image heights) and enter the second lens group G2 can be maintained small. Therefore, variations in the angle of view during focusing operations can be suppressed. In addition, by configuring the tenth lens L10 to have a negative refractive power and a meniscus shape with a concave surface toward the object side, spherical aberration and lateral chromatic aberration can be favorably corrected.

It is preferable for the second lens group G2 to substantially consist of a single cemented lens formed by cementing a lens having a positive refractive power and a lens having a negative refractive power as illustrated in FIG. 2. In this case, although the weight of the second lens group G2 that performs focusing operations will become greater than in a case that the second lens group G2 consists of a single lens, variations in chromatic aberrations during focusing operations can be favorably suppressed. Note that the cemented lens formed by cementing the lens having a positive refractive power and the lens having a negative refractive power together maybe that which is configured such that the refractive powers of the two lenses that constitute the cemented lens are positive and negative in order from the object side, or that which is configured such that the refractive powers of the two lenses that constitute the cemented lens are negative and positive in order from the object side.

In the case that the second lens group G2 substantially consists of a single cemented lens formed by cementing the lens having a positive refractive power and the lens having a negative refractive power as described above, it is preferable for Conditional Formula (3) below to be satisfied.

$$35 < \nu 2p \qquad (3)$$

$$45 < \nu 2p \qquad (3\text{-}1)$$

$$70 < \nu 2p \qquad (3\text{-}2)$$

wherein ν2p is the Abbe's number of the positive lens within the second lens group with respect to the d line.

In the case that Conditional Formula (3) is satisfied, variations in chromatic aberrations during focusing operations can be favorably suppressed. In order to cause the advantageous effects obtained by satisfying Conditional Formula (3) to become more prominent, it is more preferable for Conditional Formula (3-1) to be satisfied, and even more preferable for Conditional Formula (3-2) to be satisfied. In the second embodiment, the value of ν2p is set to be greater than 80, which is sufficiently large. Therefore, Conditional Formula (3-2) is satisfied, and variations in chromatic aberrations during focusing operations can be favorably suppressed.

In the second embodiment, the basic lens configurations of the third lens group G3 are the same as those of the first embodiment. Thereby, the same advantageous effects as those obtained by the configurations in common with those of the first embodiment can be obtained.

Next, a wide angle lens according to a third, embodiment of the present invention will be described with reference to FIG. 3. FIG. 3 is a sectional diagram that illustrates the lens configuration of the wide angle lens according to the third embodiment of the present invention, which corresponds to the wide angle lens of Example 3 to be described later.

As illustrated in FIG. 3, the first lens group G1 of the third embodiment has the same basic lens configurations for first through, fourth lenses L1, L2, L3, and L4, as well as for a sixth lens L6 and a tenth lens L10. The operational effects of these lens configurations are the same as those described in connection with the first embodiment. Hereinafter, portions of the first lens group G1 of the third embodiment which are different from those of the first embodiment will be described.

As illustrated in FIG. 3, a fifth lens L5, which is the fifth lens in order from the object side within the first lens group G1, may be configured as that having a positive refractive power and a meniscus shape with a convex surface toward the image side. Thereby, in this case as well, astigmatism, which is generated as light beams pass through each of the second lens L2, the third lens L3, and the fourth lens L4, can be favorably corrected.

In addition, as illustrated in FIG. 3, a seventh lens L7 having a convex surface toward the object side, which is the seventh lens in order from the object side, may be provided, in the first lens group G1. Thereby, spherical aberration and astigmatism can be favorably balanced.

Further, as illustrated in FIG. 3, the first lens group G1 may be of a configuration which is equipped with a cemented lens formed by a biconcave eighth lens L8 having a negative refractive power and a biconvex ninth lens L9, provided eighth in order from the object, side, and an aperture stop St provided adjacent to the cemented lens toward the image side thereof. Longitudinal chromatic aberration and/or lateral chromatic aberration can be more favorably corrected by providing a cemented lens formed by cementing a lens having a positive refractive power and a lens having a negative refractive power together at a position more toward the image side than the fourth lens L4 and toward the object side from the aperture stop St, and further by adopting a lens configuration for the cemented lens as illustrated in FIG. 3.

Further, the configurations of the lenses within the first lens group G1 more toward the image side than the aperture stop St may be a biconvex tenth lens L10, a biconvex eleventh, lens L11, and a cemented lens formed by cementing a biconvex twelfth lens L12 and a biconcave thirteenth lens L13 together, provided in this order from the object side. In the third embodiment, the tenth lens L10, the eleventh lens 11, and the twelfth lens L12 bear the main portion of the positive refractive power of the entire system. By providing these lenses toward the image side of the aperture stop St, the incident angle of rays of light which have passed through the peripheral portions of the first lens group G1 (portions having high image heights) and enter the second lens group G2 can be maintained small. Therefore, variations in the angle of view during focusing operations can be suppressed. In addition, by configuring a thirteenth lens L13 to be of a biconcave shape, spherical aberration and lateral chromatic aberration can be favorably corrected.

Further, the second lens group G2 may substantially consist of a single lens having a negative refractive power, as illustrated in FIG. 3. In the case that the second lens group G2 is configured by a single lens in this manner, a reduction in the weight of the second lens group G2 that performs focusing operations can be favorably realized. Note that in the third embodiment, the second lens group G2 is a $21^{st}$ lens L21 having a negative refractive power and a meniscus shape with a convex surface toward the object side. By configuring the $21^{st}$ lens L21 as a meniscus lens with a convex surface toward the object side, variations in spherical aberration during focusing operations can be more favorably suppressed.

In addition, in the case that the second lens group G2 substantially consists of a single lens having a negative refractive power as described above, it is preferable for Conditional Formula (4) below to be satisfied.

$$35 < v2n \qquad (4)$$

wherein v2n is the Abbe's number of the negative lens within the second lens group with respect to the d line.

In the case that Conditional Formula (4) is satisfied, variations in chromatic aberrations during focusing operations can be more favorably suppressed. With respect to Conditional Formula (4), the value of v2n is set to be greater than 40, which is a sufficiently large value, in the third embodiment. Therefore, Conditional Formula (4) is satisfied, and variations in chromatic aberrations during focusing operations can be more favorably suppressed.

As shown in the third embodiment, the third lens group G3 may consist of a cemented lens formed by cementing a biconvex $31^{st}$ lens L31 and a $32^{nd}$ lens L32 having a negative refractive power and a meniscus shape with a concave surface toward the object side, which are provided in this order from the object side, together. In this case as well, longitudinal chromatic aberration and lateral chromatic aberration can be favorably balanced.

Next, a wide angle lens according to a fourth embodiment of the present invention will be described with reference to FIG. 4. FIG. 4 is a sectional diagram that illustrates the lens configuration of the wide angle lens according to the fourth embodiment of the present invention, which corresponds to the wide angle lens of Example 4 to be described later.

As illustrated in FIG. 4, the first lens group G1 of the fourth embodiment has the same basic lens configurations for first and second lenses L1 and L2, as well as for fourth through ninth lenses L4 through L9. The operational effects of these lens configurations are the same as those described in connection with the first embodiment. Hereinafter, portions of the first lens group G1 of the third embodiment which are different from those of the first embodiment will be described.

As illustrated in FIG. 4, in the fourth embodiment, a third lens L3, which is the third lens in order from the object side within the first lens group G1, is configured as a biconcave lens having a surface with a radius of curvature having the smaller absolute value toward the image side. In the case that the shape of the third lens L3 in this manner as well, the incident angles of rays of light that pass through the second lens group G2 and enter the third lens group G3 can be maintained small. Therefore, the generation of astigmatism can be favorably decreased.

As illustrated in FIG. 4, the configurations of the lenses within the first lens group G1 more toward the image side than the aperture stop St are a biconvex ninth lens L9, a tenth lens L10 having a positive refractive power and a meniscus shape with a convex surface toward the image side, and a cemented lens formed by cementing an eleventh lens L11 having a positive refractive power and a meniscus shape with a convex surface toward the image side and a biconcave twelfth lens L12 together, provided in this order from the object side. In the fourth embodiment, the ninth lens L9, the tenth lens L10, and the eleventh lens 11 bear the main portion of the positive refractive power of the entire system. By providing these lenses toward the image side of the aperture stop St, the incident angle of rays of light which have passed, through the peripheral portions of the first, lens group G1 (portions having high image heights) and enter the second lens group G2 can be maintained small. Therefore, variations in the angle of view during focusing operations can be suppressed. In addition, by configuring the twelfth lens L12 to be of a biconcave shape, spherical aberration and lateral chromatic aberration can be favorably corrected.

The basic lens configurations of the first lens group G1, the second lens group G2, and the third lens group G3 of the fourth embodiment other than the configurations within the first lens group G1 described above are the same as those of the first embodiment. The descriptions of the configurations in common with the first embodiment and the operational effects thereof are the same as those of the first embodiment.

Next, a wide angle lens according to a fifth embodiment of the present invention will be described with reference to FIG. 5. FIG. 5 is a sectional diagram that illustrates the lens configuration of the wide angle lens according to the fifth embodiment of the present invention, which corresponds to the wide angle lens of Example 5 to be described later.

The fifth embodiment differs from, the first, embodiment only in the lens configurations within the first lens group G1 provided more toward the image side than the aperture stop St. The other lens configurations within the first lens group G1 as well as the basic lens configurations of the second lens group G2 and the third, lens group G3 are the same as those of the first embodiment. The descriptions of the configurations in common with the first embodiment and the operational effects thereof are the same as those of the first embodiment.

In the fifth embodiment, the configurations of the lenses within the first lens group G1 more toward the image side than the aperture stop St are a biconvex ninth lens L9, a biconvex tenth lens L10, and a cemented lens formed by cementing an eleventh lens L11 having a positive refractive power and a meniscus shape with a convex surface toward the image side and a twelfth lens L12 having a negative refractive power and a meniscus shape with a concave surface toward the object side together, provided in this order from the object side. In the fifth embodiment, three lenses having positive refractive powers, which are the ninth lens L9, the tenth lens L10, and the eleventh lens 11, bear the main portion of the positive refractive power of the entire system. By providing these lenses toward the image side of the aperture stop St, the incident angle of rays of light which have passed through the peripheral portions of the first lens group G1 (portions having high image heights) and enter the second lens group G2 can be maintained, small. Therefore, variations in the angle of view during focusing operations can be suppressed. In addition, by configuring the twelfth lens L12 to be of a biconcave shape, spherical aberration and lateral chromatic aberration can be favorably corrected.

The wide angle lenses of the first through fifth embodiments of the present invention may adopt any one or arbitrary combinations of the preferred configurations described in connection with the wide angle lenses of the first through fifth embodiments within a range which is consistent with the basic configurations of the embodiments described above.

Note that in the case that the present wide angle lens is used in an environment in which the lens is likely to become damaged, such as outdoors, it is preferable for a material which is resistant to surface deterioration caused by wind and rain, capable of bearing temperature changes due to receiving direct sunlight, and further resistant against chemical agents such as oil and detergent to be employed for the lens provided most toward the object side. That is, a material having high water resistance, climate resistance, acid resistance, and chemical resistance, which is hard and not likely to break is preferable for use as the material of the lens provided most toward the object side. In the case that such demand is considered to be important, it is preferable for the material, of the lens provided most toward the object side to be glass. Alternatively, the material of the lens provided most toward the object side may be a transparent ceramic.

In addition, in the case that the present wide angle lens is used in an environment in which the lens is likely to become damaged, it is preferable for a protective multilayer film coating to be administered. Further, an antireflective coating film may also be administered in order to reduce ghost light during use.

Note that the first through fifth embodiments have been described as cases in which the optical member PP is provided more toward the image side than the lens most toward the image side. Alternatively, various filters may be provided among each of the lenses. As a further alternative, coatings that have the same functions as the various filters may be administered on the surfaces of the lenses.

Next, numerical examples of the wide angle lens of the present invention will be described. FIG. 1 through FIG. 5 are sectional diagrams of the wide angle lenses of Examples 1 through 5.

Various data regarding the wide angle lenses of Examples 1 through 5 are shown in Table 1 through Table 10 below. Hereinafter, a description will be given mainly of Example 1. However, the manners in which the data are shown and the meanings of the symbols are the basically the same, and therefore redundant descriptions will be omitted.

Table 1 shows basic lens data of the wide angle lens of Example 1 when focused on an object at infinity. In Table 1, ith (i=1, 2, 3, ... ) lens surface numbers that sequentially increase from the object side to the image side, with the lens surface at the most object side designated as first, are shown in the column Si. The radii of curvature of ith surfaces are shown in the column Ri, the distances between an ith surface and an i+1st surface along the optical axis Z are shown in the column Di. The numerical value in the lowermost row of column Di shows the distance between the final surface within the table and the imaging surface Sim. Note that the signs of the radii of curvature are positive in cases that the surface shape is convex toward the object side, and negative in cases that the surface shape is convex toward the image side.

In addition, in the basic lens data, the refractive indices of jth (j=1, 2, 3, ... ) constituent elements that sequentially increase from the object side to the image side, with the lens at the most object side designated as first, with respect to the d line (wavelength: 587.6 nm) are shown in the column Ndj. The Abbe's numbers of the jth constituent element with respect to the d line are shown in the column vdj.

Note that the aperture stop St and the optical member PP is also included in the table that shows basic lens data. "St" is shown along with the surface number of the surface that corresponds to the aperture stop St.

In the Table that shows basic lens data, "Variable 1" and "Variable 2" are shown in the column of the distances among surfaces for distances that change during focusing operations. "Variable 1" is the distance between the first lens group G1 and the second lens group G2, and "Variable 2" is the distance between the second lens group G2 and the third lens group G3.

Table 2 shows various items and the variable distances of the wide angle lens of Example 1 in a state focused on infinity and a state focused on a shortest imaging distance (8.31458). The table that shows the various items shows values of the focal length f of the entire system, the back focus Bf (air converted length), the F number (Fno.), and the full angle of view (2ω) at each of the state focused on infinity and the state focused on a shortest imaging distance (8.31458). The values in the table that shows the various items are related to the d line. The table that shows the variable distances shows the values of aforementioned "Variable 1" and "Variable 2". Note that in Examples 1 through 5, the numerical values of the data are those which are standardized such that the focal length f of the entire lens system in a state focused on infinity is 1, In addition, the numerical values shown in the tables of the present specification are rounded off at a predetermined number of digits.

TABLE 1

Example 1

| Si | Ri | Di | Ndj | vdj |
|---|---|---|---|---|
| 1 | 3.4090 | 0.4300 | 1.51633 | 64.14 |
| 2 | 24.2930 | 0.0050 | | |
| 3 | 2.4536 | 0.0873 | 1.49700 | 81.54 |
| 4 | 1.0881 | 0.4476 | | |
| 5 | 12.3991 | 0.0748 | 1.49700 | 81.54 |
| 6 | 1.0016 | 0.42567 | | |
| 7 | −2.4139 | 0.0665 | 1.84666 | 23.78 |
| 8 | 2.6272 | 0.0901 | | |
| 9 | 8.4119 | 0.2235 | 1.84666 | 23.78 |
| 10 | −3.3005 | 0.2898 | | |
| 11 | 6.1722 | 0.2432 | 1.85026 | 32.27 |
| 12 | −4.7452 | 0.83941 | | |
| 13 | 10.0982 | 0.1705 | 1.77250 | 49.60 |
| 14 | 1.0805 | 0.3145 | 1.49700 | 81.54 |
| 15 | −4.1231 | 0.2636 | | |
| 16 (St) | ∞ | 0.40671 | | |
| 17 | 3.0798 | 0.3403 | 1.49700 | 81.54 |
| 18 | −1.6938 | 0.00083 | | |
| 19 | 2.6255 | 0.1673 | 1.60300 | 65.44 |
| 20 | 25.2028 | 0.0008 | | |
| 21 | 1.6575 | 0.2944 | 1.49700 | 81.54 |
| 22 | −2.2680 | 0.0590 | 1.69680 | 55.53 |
| 23 | 1.4095 | Variable | | |
| 24 | 1.5367 | 0.1241 | 1.49700 | 81.54 |
| 25 | 2.7954 | Variable | | |
| 26 | 1.9089 | 0.0561 | 1.61340 | 44.27 |
| 27 | 1.0235 | 0.1199 | | |
| 28 | 2.9741 | 0.2749 | 1.49700 | 81.54 |
| 29 | −1.2930 | 0.0561 | 1.73800 | 32.26 |
| 30 | −3.2777 | 0.2079 | | |
| 31 | ∞ | 0.0956 | 1.51633 | 64.14 |
| 32 | ∞ | 0.8126 | | |

TABLE 2

Example 1

| Object Distance | ∞ | 8.31458 |
|---|---|---|
| Items (d line) | | |
| f | 1.000 | 0.974 |
| Bf | 1.084 | 0.987 |
| Fno. | 1.9 | 1.9 |
| 2ω (°) | 74.6 | 74.4 |
| Variable Distances during Focusing Operations | | |
| Variable 1 | 0.36503 | 0.17623 |
| Variable 2 | 0.04087 | 0.22966 |

TABLE 3

Example 2

| Si | Ri | Di | Ndj | vdj |
|---|---|---|---|---|
| 1 | 2.9340 | 0.4353 | 1.51633 | 64.14 |
| 2 | 14.2713 | 0.0050 | | |
| 3 | 1.7506 | 0.0871 | 1.49700 | 81.54 |
| 4 | 1.0565 | 0.2146 | | |
| 5 | 1.6955 | 0.0746 | 1.49700 | 81.54 |
| 6 | 0.8843 | 0.3527 | | |
| 7 | 214.7484 | 0.0663 | 1.80518 | 25.42 |
| 8 | 1.0532 | 0.3554 | | |
| 9 | 2.6364 | 0.2021 | 1.80518 | 25.42 |
| 10 | −3.7930 | 0.0352 | | |
| 11 | −2.3143 | 0.0580 | 1.49700 | 81.54 |
| 12 | 2.9918 | 0.6713 | | |
| 13 | 3.6884 | 0.3732 | 1.77250 | 49.60 |
| 14 | 1.1355 | 0.5739 | 1.49700 | 81.54 |
| 15 | −2.2292 | 0.0829 | | |
| 16 (St) | ∞ | 0.0829 | | |
| 17 | 2.5540 | 0.3982 | 1.49700 | 81.54 |
| 18 | −1.5742 | 0.0083 | | |
| 19 | −2.2177 | 0.0651 | 1.51823 | 58.90 |
| 20 | −4.0242 | Variable 1 | | |
| 21 | 2.3975 | 0.4119 | 1.49700 | 81.54 |
| 22 | −1.5548 | 0.0589 | 1.77250 | 49.60 |
| 23 | −5.3200 | Variable 2 | | |
| 24 | 1.7398 | 0.0560 | 1.61340 | 44.27 |
| 25 | 1.0970 | 0.0802 | | |
| 26 | 1.6935 | 0.3592 | 1.49700 | 81.54 |
| 27 | −1.3362 | 0.0560 | 1.73800 | 32.26 |
| 28 | −10.5475 | 0.2073 | | |
| 29 | ∞ | 0.0954 | 1.51633 | 64.14 |
| 30 | ∞ | 0.8861 | | |

TABLE 4

Example 2

| Object Distance | ∞ | 8.31458 |
|---|---|---|
| Items (d line) | | |
| F | 1.003 | 0.982 |
| Bf | 1.156 | 1.058 |
| F no. | 1.9 | 1.9 |
| 2ω (°) | 74.2 | 74.0 |
| Variable Distances during Focusing Operations | | |
| Variable 1 | 0.97813 | 0.80741 |
| Variable 2 | 0.04250 | 0.21322 |

TABLE 5

Example 3

| Si | Ri | Di | Ndj | vdj |
|---|---|---|---|---|
| 1 | 3.0816 | 0.4355 | 1.57135 | 52.95 |
| 2 | 13.7412 | 0.0050 | | |
| 3 | 2.2127 | 0.0875 | 1.61800 | 63.33 |
| 4 | 1.0706 | 0.4764 | | |
| 5 | 33.5072 | 0.0750 | 1.56908 | 71.30 |
| 6 | 1.0801 | 0.4915 | | |
| 7 | −1.4781 | 0.0666 | 1.84666 | 23.78 |
| 8 | 3.1236 | 0.1229 | | |
| 9 | −17.1403 | 0.2166 | 1.84666 | 23.78 |
| 10 | −2.2648 | 0.0275 | | |
| 11 | 3.5807 | 0.5252 | 1.75500 | 52.32 |
| 12 | −2.0603 | 0.5192 | | |
| 13 | 3.6888 | 0.1458 | 1.84666 | 23.78 |
| 14 | 31.7686 | 0.3011 | | |
| 15 | −2.8841 | 0.0829 | 1.83481 | 42.71 |

TABLE 5-continued

Example 3

| Si | Ri | Di | Ndj | νdj |
|---|---|---|---|---|
| 16 | 1.1097 | 0.3163 | 1.49700 | 81.54 |
| 17 | −2.5338 | 0.2442 | | |
| 18 (St) | ∞ | 0.4151 | | |
| 19 | 2.6815 | 0.4536 | 1.49700 | 81.54 |
| 20 | −1.6809 | 0.0008 | | |
| 21 | 2.7964 | 0.1619 | 1.73800 | 32.26 |
| 22 | −44.1967 | 0.0008 | | |
| 23 | 1.9805 | 0.2670 | 1.49700 | 81.54 |
| 24 | −1.9633 | 0.0591 | 1.83481 | 42.71 |
| 25 | 5.8110 | Variable 1 | | |
| 26 | 1.6705 | 0.0562 | 1.83481 | 42.71 |
| 27 | 1.0084 | Variable 2 | | |
| 28 | 9.8956 | 0.2083 | 1.59522 | 67.74 |
| 29 | −1.6064 | 0.0562 | 1.92286 | 18.90 |
| 30 | −3.5250 | 0.2082 | | |
| 31 | ∞ | 0.0958 | 1.51633 | 64.14 |
| 32 | ∞ | 0.8115 | | |

TABLE 6

Example 3

| Object Distance | ∞ | 8.31458 |
|---|---|---|
| Items (d line) | | |
| f | 1.000 | 0.969 |
| Bf | 1.083 | 0.988 |
| F no. | 1.9 | 1.9 |
| 2ω (°) | 74.8 | 74.6 |
| Variable Distances during Focusing Operations | | |
| Variable 1 | 0.03744 | 0.12947 |
| Variable 2 | 0.44162 | 0.34959 |

TABLE 7

Example 4

| Si | Ri | Di | Ndj | νdj |
|---|---|---|---|---|
| 1 | 3.7520 | 0.3975 | 1.72916 | 54.68 |
| 2 | 19.4564 | 0.0050 | | |
| 3 | 3.2989 | 0.0871 | 1.49700 | 81.54 |
| 4 | 1.0923 | 0.4952 | | |
| 5 | −211.5179 | 0.0746 | 1.49700 | 81.54 |
| 6 | 1.0749 | 0.4721 | | |
| 7 | −1.6704 | 0.0663 | 1.84666 | 23.78 |
| 8 | 2.8061 | 0.1037 | | |
| 9 | 22.8457 | 0.4038 | 1.84666 | 2.378 |
| 10 | −2.5275 | 0.0295 | | |
| 11 | 2.9428 | 0.3341 | 1.83400 | 37.16 |
| 12 | −3.8853 | 0.98065 | | |
| 13 | 20.9801 | 0.0508 | 1.78590 | 44.20 |
| 14 | 0.9072 | 0.3335 | 1.49700 | 81.54 |
| 15 | −2.8033 | 0.2967 | | |
| 16 (St) | ∞ | 0.29025 | | |
| 17 | 2.4659 | 0.3301 | 1.49700 | 81.54 |
| 18 | −1.4486 | 0.00829 | | |
| 19 | 1.8767 | 0.1725 | 1.60300 | 65.44 |
| 20 | 17.1237 | 0.0439 | | |
| 21 | −5.5245 | 0.1591 | 1.49700 | 81.54 |
| 22 | −1.4707 | 0.0589 | 1.69680 | 55.53 |
| 23 | 1.4054 | Variable 1 | | |
| 24 | 1.5344 | 0.2022 | 1.80400 | 46.58 |
| 25 | 62.4771 | Variable 2 | | |
| 26 | 1.8473 | 0.0560 | 1.77254 | 49.60 |
| 27 | 1.0143 | 0.1609 | | |
| 28 | 5.1357 | 0.2538 | 1.49700 | 81.54 |
| 29 | −1.3436 | 0.0560 | 1.84666 | 23.78 |
| 30 | −2.1084 | 0.2073 | | |

TABLE 7-continued

Example 4

| Si | Ri | Di | Ndj | νdj |
|---|---|---|---|---|
| 31 | ∞ | 0.0954 | 1.51633 | 64.14 |
| 32 | ∞ | 0.8134 | | |

TABLE 8

Example 4

| Object Distance | ∞ | 8.31458 |
|---|---|---|
| Items (d line) | | |
| f | 1.000 | 0.982 |
| Bf | 1.084 | 0.986 |
| F no. | 1.9 | 1.9 |
| 2ω (°) | 74.8 | 73.8 |
| Variable Distances during Focusing Operations | | |
| Variable 1 | 0.29525 | 0.21690 |
| Variable 2 | 0.04110 | 0.11945 |

TABLE 9

Example 5

| Si | Ri | Di | Ndj | νdj |
|---|---|---|---|---|
| 1 | 3.5867 | 0.4321 | 1.52249 | 59.84 |
| 2 | 32.4524 | 0.0050 | | |
| 3 | 2.4887 | 0.0883 | 1.49700 | 81.54 |
| 4 | 1.0477 | 0.4517 | | |
| 5 | 12.8214 | 0.0757 | 1.49700 | 81.54 |
| 6 | 0.9944 | 0.44496 | | |
| 7 | −1.7857 | 0.0673 | 1.84666 | 23.78 |
| 8 | 2.6235 | 0.1008 | | |
| 9 | 26.8008 | 0.1836 | 1.84666 | 23.78 |
| 10 | −3.0345 | 0.0798 | | |
| 11 | 4.2604 | 0.2706 | 1.85026 | 32.27 |
| 12 | −2.8985 | 0.87605 | | |
| 13 | −15.3540 | 0.0529 | 1.78800 | 47.37 |
| 14 | 1.0309 | 0.3292 | 1.49700 | 81.54 |
| 15 | −3.2229 | 0.4162 | | |
| 16 (St) | ∞ | 0.20618 | | |
| 17 | 5.1870 | 0.3717 | 1.49700 | 81.54 |
| 18 | −1.4003 | 0.00083 | | |
| 19 | 2.9372 | 0.1972 | 1.60300 | 65.44 |
| 20 | −9.9451 | 0.0546 | | |
| 21 | −3.3772 | 0.1395 | 1.49700 | 81.54 |
| 22 | −1.9433 | 0.0597 | 1.75500 | 52.32 |
| 23 | −5.6121 | Variable 1 | | |
| 24 | 1.7470 | 0.0974 | 1.49700 | 81.54 |
| 25 | 2.0419 | Variable 2 | | |
| 26 | 2.0532 | 0.0568 | 1.83481 | 42.71 |
| 27 | 1.1232 | 0.0851 | | |
| 28 | 2.0326 | 0.3027 | 1.49700 | 81.54 |
| 29 | −1.4480 | 0.0568 | 1.84666 | 23.78 |
| 30 | −2.7965 | 0.2103 | | |
| 31 | ∞ | 0.0967 | 1.51633 | 64.14 |
| 32 | ∞ | 0.8238 | | |

TABLE 10

Example 5

| Object Distance | ∞ | 8.31458 |
|---|---|---|
| Items (d line) | | |
| F | 1.000 | 0.979 |
| Bf | 1.098 | 1.001 |

TABLE 10-continued

| Example 5 | | |
|---|---|---|
| Object Distance | ∞ | 8.31458 |
| F no. | 1.9 | 1.9 |
| 2ω (°) | 75.4 | 75.0 |
| Variable Distances during Focusing Operations | | |
| Variable 1 | 0.76544 | 0.26962 |
| Variable 2 | 0.08070 | 0.57651 |

All of Examples 1 through 5 are configured by the first lens group G1 having a positive refractive power, the second lens group G2 that moves along the optical axis during focusing operations, and the third lens group G3.

Table 11 shows values corresponding to Conditional Formulae (1) through (6) for Examples 1 through 5.

TABLE 11

| Formula No. | Expression | Example 1 | Example 2 | Example 3 | Example 4 | Example 5 |
|---|---|---|---|---|---|---|
| (1) | f/f1 | 0.86073 | 0.65575 | 1.36237 | 0.35557 | 0.96764 |
| (2) | f/f2 | 0.15039 | 0.17741 | −0.31541 | 0.51187 | 0.04559 |
| (3) | ν2p | 81.54 | 81.54 | — | 46.58 | 81.54 |
| (4) | ν2n | — | — | 42.71 | — | — |
| (5) | f1a | −2.61600 | −2.51470 | −3.01437 | −5.01010 | −1.77544 |
| (6) | f1b | 1.95903 | 2.02742 | 1.37273 | 3.72480 | 1.75461 |

The spherical aberration, the offense against the sine condition, the astigmatism, the distortion, and the lateral chromatic aberration of the wide angle lens of Example 1 in a state focused on infinity are shown in A through E of FIG. 6. The spherical aberration, the offense against the sine condition, the astigmatism, the distortion, and the lateral chromatic aberration of the wide angle lens in a state focused on the shortest imaging distance (8.31458) are shown in F through J of FIG. 6. The diagrams that illustrate spherical aberration, offense against the sine condition, astigmatism, and distortion are related to the d line. The diagrams that illustrate spherical aberration also show aberrations related to the g line (wavelength: 435.8 nm), the C line (wavelength: 656.3 nm), and the F line (wavelength: 486.1 nm). In addition, the diagrams that illustrate lateral chromatic aberration also show aberrations related to the F line (wavelength: 486.1 nm). In the diagrams that illustrate astigmatism, aberrations in the sagittal direction are indicated by solid lines, and aberrations in the tangential direction are indicated by dotted lines. In the diagrams that illustrate spherical aberrations, "Fno." denotes F numbers. In the other diagrams that illustrate the aberrations, ω denotes half angles of view.

Similarly, A through J of FIG. 7, A through J of FIG. 8, A through J of FIG. 9, and A through J of FIG. 10 are diagrams that illustrate aberrations of the wide angle lenses of Examples 2 through 5 in a state focused on infinity and a state focused on the shortest imaging distance (8.31458).

FIG. 11 is a diagram that schematically illustrates the configuration of an imaging apparatus that employs a wide angle lens according to an embodiment of the present invention, as an example of an imaging apparatus according to an embodiment of the present invention. Examples of such an imaging apparatus include a digital camera, a broadcast camera, and a cinematic camera.

The imaging apparatus 10 illustrated in FIG. 11 is equipped with a wide angle lens 1, a filter 2 provided toward the image side of the wide angle lens 1, an imaging element 3 that captures images of subjects imaged by the wide angle lens, and a signal processing section 4 that administers computation processes on signals output from the imaging element 3. The wide angle lens 1 has a positive first lens group G1 which is equipped with an aperture stop St, a second lens group G2 that moves along the optical axis during focusing operations, and a third lens group G3. FIG. 11 illustrates each of the lens groups in a conceptual manner. The imaging element 3 captures images of subjects formed by the wide angle lens 1 and converts the images into electrical signals. An imaging surface of the imaging element 3 is positioned to match an image formation plane of the wide single lens. A CCD, a CMOS, or the like may be employed as the imaging element 3.

In addition, the imaging apparatus 10 is equipped with a focus control section 5 for adjusting the focus of the wide angle lens 1. Note that although not illustrated in FIG. 11, the imaging apparatus 10 may further be equipped with an aperture control section for controlling the aperture diameter of the aperture stop St.

The present invention has been described with reference to the embodiments and Examples thereof. However, the present invention is not limited to the embodiments and Examples described above, and various modifications are possible. For example, the values of the radii of curvature of each lens, the distances among surfaces, the refractive indices, the Abbe's numbers, the aspherical surface coefficients, etc., are not limited to the numerical values indicated in connection with the Examples, and may be other values.

What is claimed is:

1. A wide angle lens, substantially consisting of three lens groups, which are:
   a first lens group having a positive refractive power which is fixed in the direction of an optical axis during focusing operations;
   a second lens group that moves along the optical axis during focusing operations; and
   a third lens group which is fixed in the direction of the optical axis during focusing operations, provided in this order from an object side;
   the first lens group comprising:
   a first lens having a positive refractive power and is of a meniscus shape having a convex surface toward the object side;
   a second lens having a negative refractive power and is of a meniscus shape having a convex surface toward the object side;
   a third lens having a negative refractive power and a concave surface with a radius of curvature having the smaller absolute value toward an image side; and
   a fourth lens having a negative refractive power, provided in this order from the object side;
   the wide angle lens further comprising:
   a cemented lens formed by cementing a lens having a positive refractive power and a lens having a negative refractive power together, provided more toward the image side than the fourth lens; and an aperture stop provided adjacent to the cemented lens toward the image side thereof;
the second lens group substantially consisting of two or fewer lenses;
the third lens group comprising at least one positive lens; and
the wide angle lens satisfying the following conditional formula:

$$0.00 < f/f1 < 2.00 \quad (1)$$

wherein f1 is the focal length of the first lens group, and f is the focal length of the entire system in a state focused on infinity.

2. A wide angle lens as defined in claim 1 that further satisfies the following conditional formula:

$$0.40 < f/f1 < 1.60 \quad (1\text{-}1)$$

3. A wide angle lens as defined in claim 2 that further satisfies the following conditional formula:

$$0.50 < f/f1 < 1.50 \quad (1\text{-}2)$$

4. A wide angle lens as defined in claim 1 that further satisfies the following conditional formula:

$$0.00 < f/|f2| < 0.50 \quad (2)$$

wherein f2 is the focal length of the second lens group.

5. A wide angle lens as defined in claim 4 that further satisfies the following conditional formula:

$$0.05 < f/|f2| 0.40 \quad (2\text{-}1)$$

6. A wide angle lens as defined in claim 1, wherein:
the first lens group further comprises a fifth lens having a positive refractive power, provided adjacent to the fourth lens toward the image side thereof.

7. A wide angle lens as defined in claim 1, wherein:
the second lens group substantially consists of a single lens having a positive refractive power.

8. A wide angle lens as defined in claim 1, wherein:
the second lens group substantially consists of a single cemented lens, formed by cementing a lens having a positive refractive power and a lens having a negative refractive power together.

9. A wide angle lens as defined in claim 7 that satisfies Conditional Formula (3) below:

$$35 < \nu 2p \quad (3)$$

wherein $\nu 2p$ is the Abbe's number of the positive lens within the second lens group with respect to the d line.

10. A wide angle lens as defined in claim 9 that, satisfies Conditional Formula (3-1) below:

$$45 < \nu 2p \quad (3\text{-}1)$$

11. A wide angle lens as defined in claim 10 that satisfies Conditional Formula (3-2) below:

$$70 < \nu 2p \quad (3\text{-}2)$$

12. A wide angle lens as defined in claim 8 that satisfies Conditional Formula (3) below:

$$35 < \nu 2p \quad (3)$$

wherein $\nu 2p$ is the Abbe's number of the positive lens within the second lens group with respect to the d line.

13. A wide angle lens as defined in claim 12 that satisfies Conditional Formula (3-1) below:

$$45 < \nu 2p \quad (3\text{-}1)$$

14. A wide angle lens as defined in claim 13 that satisfies Conditional Formula (3-2) below:

$$70 < \nu 2p \quad (3\text{-}2)$$

15. A wide angle lens as defined in claim 1, wherein:
the second lens group substantially consists of a single lens having a negative refractive power.

16. A wide angle lens as defined in claim 15 that satisfies Conditional Formula (4) below:

$$35 < \nu 2n \quad (4)$$

wherein $\nu 2n$ is the Abbe's number of the negative lens within the second lens group with respect to the d line.

17. An imaging apparatus, comprising:
a wide angle lens as defined in claim 1; and
an imaging element that captures images of subjects formed by the wide angle lens.

* * * * *